(12) United States Patent
Best et al.

(10) Patent No.: US 9,471,450 B2
(45) Date of Patent: Oct. 18, 2016

(54) REDUCING DATA LOSS IN A COMPUTING STORAGE ENVIRONMENT

(71) Applicant: INTERNATIONAL BUSINESS MACHINES CORPORATION, Armonk, NY (US)

(72) Inventors: Steven F. Best, Groton, MA (US); Janice M. Girouard, Austin, TX (US); Ziv Serlin, Givatyim (IL); Yehuda Shiran, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 338 days.

(21) Appl. No.: 13/789,009

(22) Filed: Mar. 7, 2013

(65) Prior Publication Data

US 2014/0258658 A1 Sep. 11, 2014

(51) Int. Cl.
*G06F 12/00* (2006.01)
*G06F 11/20* (2006.01)
*G06F 3/06* (2006.01)

(52) U.S. Cl.
CPC .......... *G06F 11/2094* (2013.01); *G06F 3/065* (2013.01); *G06F 3/0619* (2013.01); *G06F 3/0689* (2013.01)

(58) Field of Classification Search
CPC .... G06F 3/065; G06F 3/0619; G06F 3/0689; G06F 11/2094
USPC ................................ 711/161, 162; 714/47.2
See application file for complete search history.

(56) References Cited

U.S. PATENT DOCUMENTS

| | | | |
|---|---|---|---|
| 6,446,183 B1 * | 9/2002 | Challenger et al. .......... 711/170 |
| 7,526,684 B2 | 4/2009 | Bicknell et al. |
| 7,574,623 B1 | 8/2009 | Goel et al. |
| 7,636,872 B2 | 12/2009 | Kramer et al. |
| 2010/0274983 A1 * | 10/2010 | Murphy et al. ................ 711/162 |
| 2010/0318837 A1 | 12/2010 | Murphy et al. |
| 2011/0231730 A1 * | 9/2011 | Allen ..................... G06F 11/106 714/758 |
| 2013/0159603 A1 * | 6/2013 | Whitney ....................... 711/103 |

* cited by examiner

*Primary Examiner* — David X Yi
*Assistant Examiner* — Alan Otto
(74) *Attorney, Agent, or Firm* — Griffiths & Seaton PLLC

(57) ABSTRACT

For reducing data loss by a processor device in a computing storage environment, data blocks are prioritized for creating an N number of additional secondary copies of data using a vulnerability factor for identifying those of the data blocks having a probability of failure. The data blocks include at least a primary copy and a secondary copy of the data.

33 Claims, 4 Drawing Sheets

REDUCING DATA LOSS IN A COMPUTING STORAGE ENVIRONMENT

BACKGROUND OF THE INVENTION

1. Field of the Invention

The present invention relates in general to computers, and more particularly for reducing data loss by a processor device in a computing storage environment.

2. Description of the Related Art

In today's society, computer systems are commonplace. Computer systems may be found in the workplace, at home, or at school. Computer systems may include data storage systems, or disk storage systems, to process and store data. These computer systems are constantly improving in terms of speed, reliability, and processing capability. As a result, computers are able to handle more complex and sophisticated applications. However, as computers improve, performance demands placed on storage system and input/output (I/O) devices increase.

In general, I/O performance has had difficulty keeping pace with the growing capabilities of the computers. Large amounts of data have to be processed daily and the current trend suggests that these amounts will continue being ever-increasing in the foreseeable future. As such, computing systems face challenges in storing and preventing data loss within the various types of storage systems.

SUMMARY OF THE DESCRIBED EMBODIMENTS

In one embodiment, a method is provided for reducing data loss in a computing storage environment using a processor device. In one embodiment, by way of example only, data blocks are prioritized for creating an N number of additional secondary copies of data using a vulnerability factor for identifying those of the data blocks having a probability of failure. The data blocks include at least a primary copy and a secondary copy of the data.

In another embodiment, a computer system is provided for reducing data loss in a computing storage environment using a processor device. The computer system includes a computer-readable medium and a processor in operable communication with the computer-readable medium. In one embodiment, by way of example only, the processor prioritizes data blocks for creating an N number of additional secondary copies of data using a vulnerability factor for identifying those of the data blocks having a probability of failure. The data blocks include at least a primary copy and a secondary copy of the data.

In a further embodiment, a computer program product is provided for reducing data loss in a computing storage environment using a processor device. The computer-readable storage medium has computer-readable program code portions stored thereon. The computer-readable program code portions include a first executable portion that prioritizes data blocks for creating an N number of additional secondary copies of data using a vulnerability factor for identifying those of the data blocks having a probability of failure. The data blocks include at least a primary copy and a secondary copy of the data.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
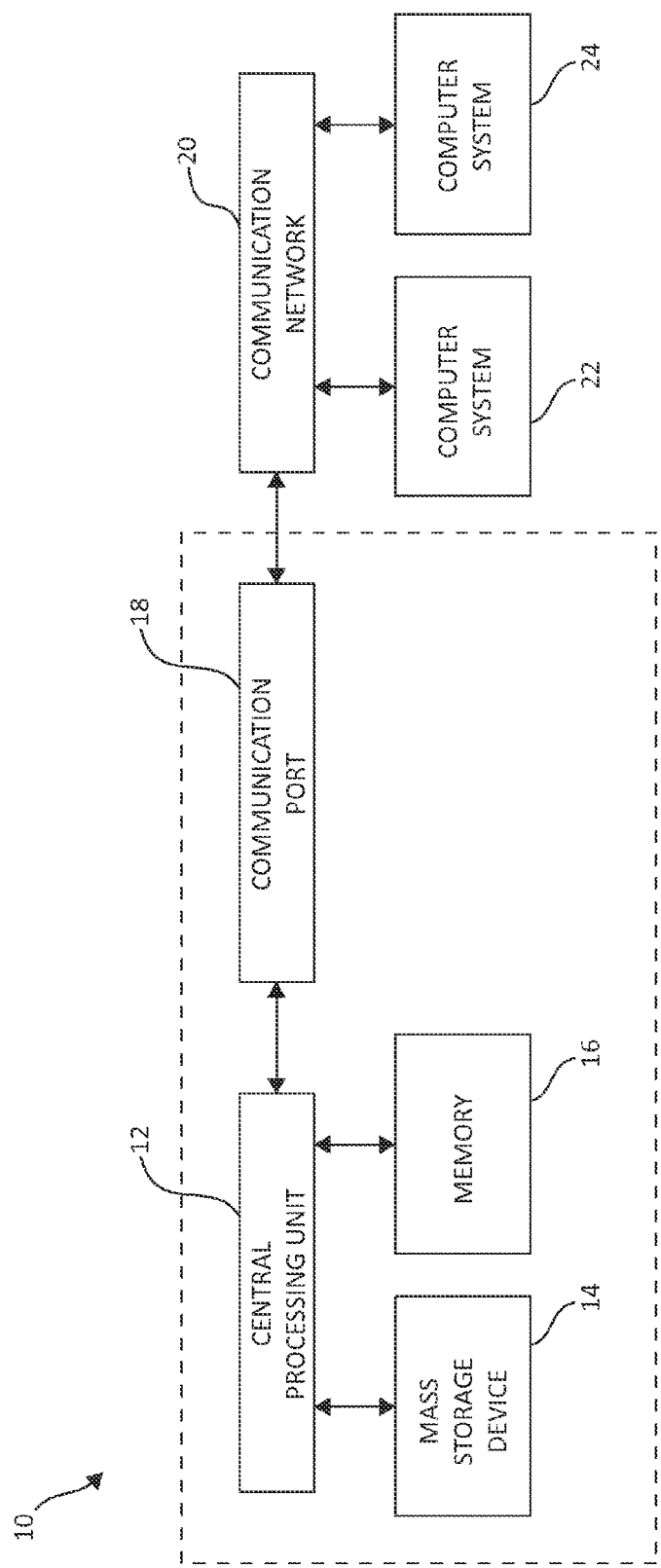
FIG. 1 is a block diagram illustrating a computing system environment having an example storage device in which aspects of the present invention may be realized.

As mentioned above, computing systems face challenges in storing and preventing data loss within the various types of storage systems. In one embodiment, this challenge is addressed by a storage system maintaining two copies of all data (e.g., a primary copy and a secondary copy). For example, if the primary copy of the data is lost or corrupted for any reason, the secondary copy (e.g., backup copy) may be used to replace the data. However, this scheme significantly cuts down the overall capacity of the storage system solution (e.g., cuts down on capacity by up to 50%) of the disk capacity. This loss in overall capacity is mandated by the need for reliable access to the data. It should be noted that throughout the description, herein, the term "secondary" may also be interchanged with and/or refer to the term "backup."

Nonetheless, it is still possible to lose both copies of the data, or to find that the two copies of the data (e.g., primary copy and secondary copy of data) differ without a clear understanding of which of the two values (e.g., values of primary and secondary data) is the correct value. Moreover, when the loss of data in a storage system does occur, a user may lose confidence in the storage product and the storage products ability to meet the users needs. Hence it is critical to minimize, if not eliminate, any possible failure to either the primary and/or secondary copies of data. To address any disk and/or storage systems regardless of the quality of the product (e.g., a disk having inferior quality), in one embodiment a solution is provided, as described below, by not assuming control of the vendors that may be providing any inferior and/or quality-compromised products, but the solution is provided for a more resilient algorithm for the various types of storage systems and/or disk environments regardless of the quality.

Thus, in one embodiment, a solution is provided for reducing data loss in a computing storage environment using a processor device. In one embodiment, by way of example only, data blocks are prioritized for creating an N number of additional secondary copies of data using a vulnerability factor for identifying those of the data blocks having a probability of failure. As described herein, an algorithm is provided for prioritizing data blocks for creating additional secondary (backup) copies (e.g., a third copy of the data, or even a 4th copy and beyond). The goal of the algorithm is to reduce the possibility of data loss within a storage system and/or disk, while maintaining the overall efficiency of the system. The algorithm identifies pages and/or data blocks within the storage system most likely to fail, especially since backing up the complete storage system is cost prohibitive.

Thus, when a storage system maintains two copies of all data (e.g., a primary copy data block and a secondary copy data block), there is a risk that one of the data blocks may become lost or corrupted for a variety of reasons. The vulnerability factor is used to indicate the risk associated with each of the data blocks. If the vulnerability factor indicates that the risk of the primary data block will become lost or corrupted, the secondary copy (e.g., backup copy) may be used to replace the primary data block and/or vice versa. However, it is still possible to lose both copies of the data, or to find that the two copies of the data (e.g., primary copy and secondary copy of data) differ without a clear understanding of which of the two values (e.g., values of primary and secondary data) is the correct value.

Thus, to address any type of scenario where the primary and/or secondary copies may become corrupted and/or lost, each of the data blocks in the storage system are prioritized, using the vulnerability factor, for creating an N number of additional backup copies of data. In other words, the prioritization of data blocks assists in identifying those data blocks that are requiring a creation of additional secondary (backup) copies (e.g., a third copy of the data, or even a 4th copy and beyond). This vulnerability factor may be composed of several other components that describe the overall risk associated with each of the data blocks. For example, the vulnerability factor may include an overall system factor, a data category factor, an exact command that is being executed factor, a response from a command factor, a time of failure factor, a success factor, an immediate vulnerability of each of the data blocks factor, and a backup copy factor.

The overall system factor takes into account that one data block (e.g., the primary copy data block) may reside on one computing system and another data block (e.g., the secondary copy data block) may reside on a separate computing system and expresses the risk and vulnerability of one data block as compared to the other data block where they reside on separate systems. The data category factor expresses the sensitivity associated with each type of operation being performed the data blocks and thus weighted values/factors may be used to express operation sensitivity for indicating a potential risk of failure of the data block based upon the sensitivity. The exact command that is being executed factor may be a numerical value, a weighted value, a weighted score, a variable, a calculation result, and/or any other number or associated score and the like that is given to the exact command that is being performed in the computing system for assisting with generating the vulnerability score. The response from a command factor may be a numerical value, a weighted value, a weighted score, a variable, a calculation result, and/or any other number or associated score and the like that is given to the response from a command and is a factor that is associated with the response from the command in the computing system for assisting with generating the vulnerability score. The time of failure factor takes into account the times of any given failure based on a calculation. For example, this calculation may be used to indicate a time since a failure last occurred in a computing system for any of the data blocks. The success factor is a numerical value assigned to a command that resulted in a successful operation without resulting in a failure to any and/or one of the data blocks. The immediate vulnerability of each of the data blocks factor is a numerical value, score, and or result of an equation that takes into account a total of all operations performed up to a present time period for the immediate vulnerability of a physical block. The backup copy factor is a vulnerability factor calculation of each individual backup copy of the primary data block. Thus, a final vulnerability factor may be the product of two factors such as the immediate vulnerability of a specified disk factor multiplied by the backup copy factor. Having computed the vulnerability factor, the vulnerability factor identifies those of the data blocks having a probability of failure. The goal of the algorithm is to reduce the possibility of data loss within a storage system and/or disk, while maintaining the overall efficiency of the system. The algorithm identifies pages and/or data blocks within the storage system most likely to fail, especially since backing up the complete storage system is cost prohibitive.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
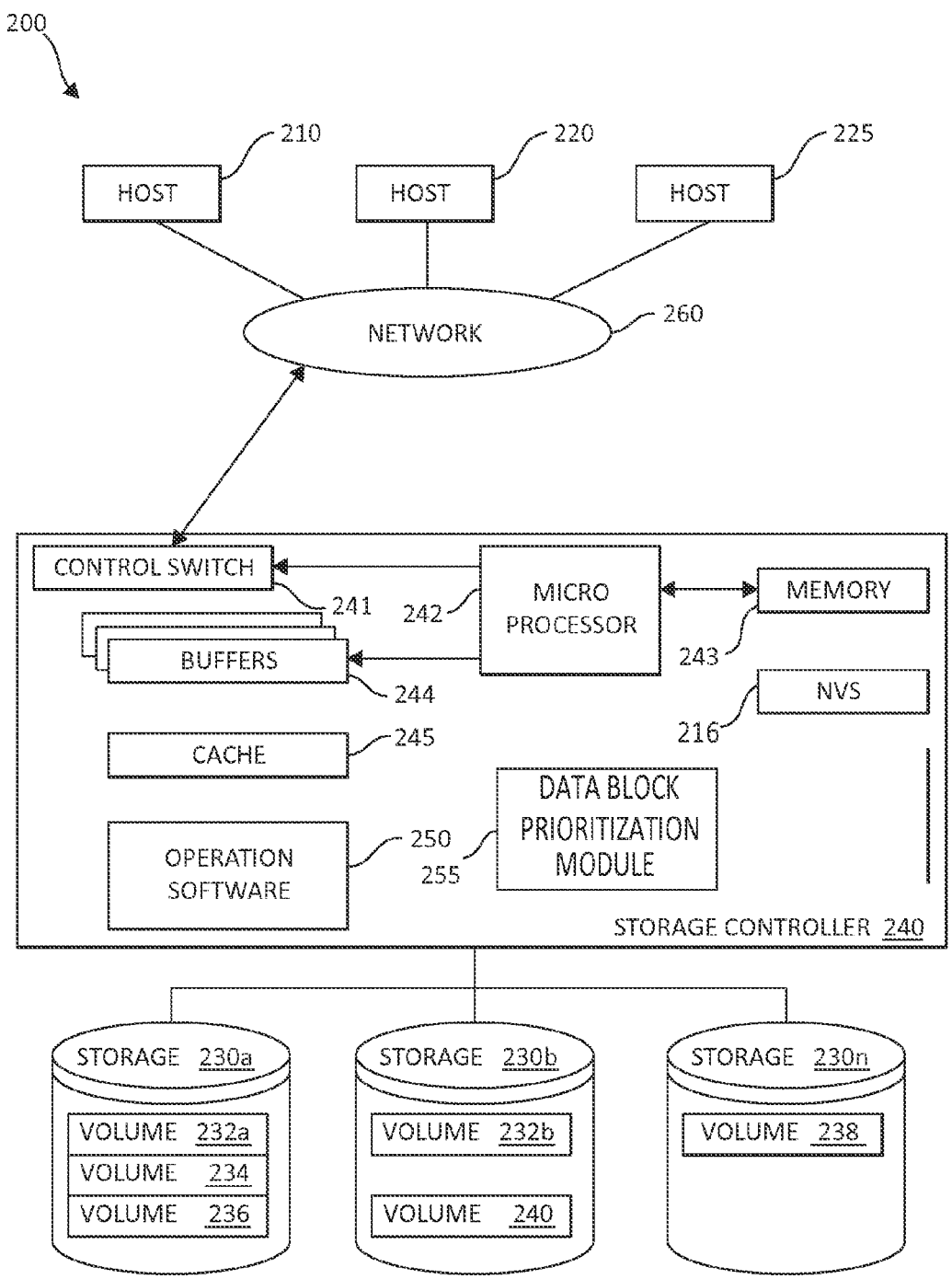
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® ProtecTIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention.

In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a prioritizing data block module 255. The prioritizing data block module 255 may work in conjunction with each and every component of the storage controller 240, the hosts 210, 220, 225, and storage devices 230. The prioritizing data block module 255 may be structurally one complete module or may be associated and/or included with other individual modules. The prioritizing data block module 255 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the prioritizing data block module 255, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, prioritizing data block module 255 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the prioritizing data block module 255 may also be located in the cache 245 or other components. As such, the prioritizing data block module 255 may be used as needed based upon the storage architecture and users preferences.

As will be further described below, in FIGS. 3 and 4, the present invention prioritizes data blocks for creating additional secondary copies of data using a vulnerability factor for identifying those of the data blocks having a probability of failure. The algorithm computes a vulnerability factor for each data block kept in the system. It should be noted that the present invention focuses on maintaining at least three and/or more copies of data and keeping active a disk, which may possibly fail. Thus, based upon computing the vulnerability factor for each one of the data blocks, an additional number of active secondary copies are added. Thus, the point of the computations, as described herein, is to selective increase the data blocks that are being backed up. For example, in one embodiment, tertiary and active backup copies of the data block are created on a selective basis.

This vulnerability factor is composed of several components that describe the overall risk associated with each of the data blocks. The vulnerability factor includes an overall system factor, a data category factor, an exact command that is being executed factor, a response from a command factor, a time of failure factor, a success factor, an immediate vulnerability of each of the data blocks factor, and a backup copy factor. For each command executed to a disk and/or storage system, the present invention computes the overall system factor, the data category factor, the exact command that is being executed factor, the response from a command factor, the time of failure factor, the success factor, the immediate vulnerability of each of the data blocks factor, and the backup copy factor to be included in the several components that describe the overall risk associated with each of the data blocks that are included in the vulnerability factor. Each of these components/factors is described below.

First, an overall system factor may be included in the vulnerability factor and may have the command form of [F_system]. The overall system factor may be the same for all data blocks stored on a given physical system and/or rack. The intent of the overall system factor is to take into account the fact that the primary copy and secondary data copy may reside on separate computing host systems. The overall system factor is used to express the vulnerability of a given data block on one system, compared to other systems in the solution. Any number of factors could be used to assign a value to the overall system factor. For example, some of the system factors that may be used and included for the overall system factor are an operating system code level to account for known kernel bugs, an application code level to account for file system or storage application code 'anomalies' (e.g., computer bugs), and/or an environmental power failure history to account for a higher probability of a loss of power due to software and/or hardware issues).

Second, the data category factor may be included in the vulnerability factor and may have the command form of [F_data_category]. The data category describes the sensitivity associated with each type of operation being performed. For example, some of system factors that may be used and included for the data category factor may be commands associated with a read operation, commands associated with a write operation, and/or commands associated with initialization (such as test unit ready). The data category allows a user and/or system to add weight to read failures over write failures (which are less critical, since a user and/or system may immediately recover by re-writing the data to another block).

A third factor that may be included in the vulnerability factor is an exact command being executed and may have the command form of [F_command].

A fourth factor that may be included in the vulnerability factor is a response from a command factor and this is a factor that is associated with the response from the command, which may have the command form of [F_cmd_response]. For example, a response of an unrecoverable read error is more catastrophic and may be weighted more than a recoverable write failure.

A fifth factor that may be included in the vulnerability factor is the time of failure factor, and this factor takes into account the time of any given failure. The time of failure factor may have the command form of [F_time]. The time of failure factor may be computed based on the inverse of the square (or some N factor) of the minutes and/or hours since a failure occurred. For example, setting a value of N equal to 2, in the form of hours, means the F_time factor for a failure experienced 5 hours ago would be $(1/5^2)$ or 0.04. Using this same N=2 example, a failure that occurred 60 hours ago would be computed $(1/60^2)=2.7$ e-4. Hence the more recent failure has a much greater impact on the probability of upcoming failures.

A sixth factor that may be included in the vulnerability factor is the success factor and may have the command form of [F_success]. Generally the success factor may be set to a 1 if the attempted command failed, and 0 if the command succeeded. By setting the success factor to 0 for success, all successful commands decrease the probability of failure in the calculation.

The vulnerability factor for the primary copy of the data block may have the command form of [F_disk_vul]. The immediate vulnerability of a given primary disk factor is the total of all operations up to a present time period for the immediate vulnerability of a physical block and is illustrated using the following equation:

$$F_{disk_{vul}} = \sum_{x=1}^{y} \frac{\left(F_{data_{category(x)}} * F_{command(x)} * F_{cmd_{response(x)}} * F_{time(x)}\right) * F_{success(x)} *}{\text{Total } I/O} \quad (1)$$

where y is for a total number of "y" operations and the total I/O is the number of input/output operations performed to a specific storage system and/or an specific disk.

As stated earlier, each data block may have an associated secondary (e.g., backup) copy [F_backup]. The backup of the primary copy may consist of at least two or more backup copies of the primary data. For each copy of the primary data, there would be a vulnerability factor $$F_{backupNdisk_{vul}} = \sum_{x=1}^{y} \frac{(F_{data_{category(x)}} * F_{command(x)} * F_{cmd_{response(x)}} * F_{time(x)})}{\text{Total } I/O} * F_{success(x)} \text{ thus} \quad (2)$$

$$F_{backup} = F_{backup1disk_{vul}} * F_{backup2disk_{vul}} * F_{backup3disk_{vul}} \ldots F_{backupMAXdisk_{vul}},$$

where MAX is the number of secondary/backup disks (and/or other storage devices) used to store data on the specified disk (and/or other storage devices).

Hence, the final vulnerability factory for any give disk/data page is the product of two factors such as the immediate vulnerability of a specified disk factor multiplied by the associated secondary (e.g., backup) copy, as shown by the following equation:

$$\text{total vulnerability} = F\_disk\_vul * F\_backup \quad (3).$$

It should be noticed that even if the primary copy of the data is likely to be faulty, if the backup disk has been error free, then the disk vulnerability will be computed to be low, as thus allowing for recovery of the data from the backup copy. However, if both the primary and backup copy (e.g., the first secondary copy) of the data are stored on a storage device (e.g., disks) that have a history of failures, then that particular data block (and/or disk other type of storage device) may receive a very high vulnerability score, thereby expediting a priority for creation of a $3^{rd}$, a $4^{th}$, and/or even a 5th backup for that particular data block (and/or disk or other type of storage device).

These final vulnerability scores, which are included in the vulnerability factor, may be used to compute the required number of backups that may be needed and/or are required for being created, and for the priority of backups within that backup count.

Moreover, various thresholds may be established to determine the number of backup copies required. For example, all data (e.g., data on a data block) having a vulnerability score of 0.000001 and higher may require a mandatory 3rd copy, and all data (e.g., data on a data block) having a vulnerability score of 0.001 may require a 4th copy and the like. These various thresholds may be predetermined and defined by a user and/or computing system.

Within each copy requirement for the additional secondary copies (e.g., the creation of a $3^{rd}$, a $4^{th}$, and/or even a 5th backup copy) for a particular data block, the priority of the individual backup copy is set by the vulnerability factor/score of that specific data block. The higher the vulnerability factor (compared to other pending backup copies that are to be created), the higher the priority of the additional secondary copies in the command execution queue.

Figure 3:
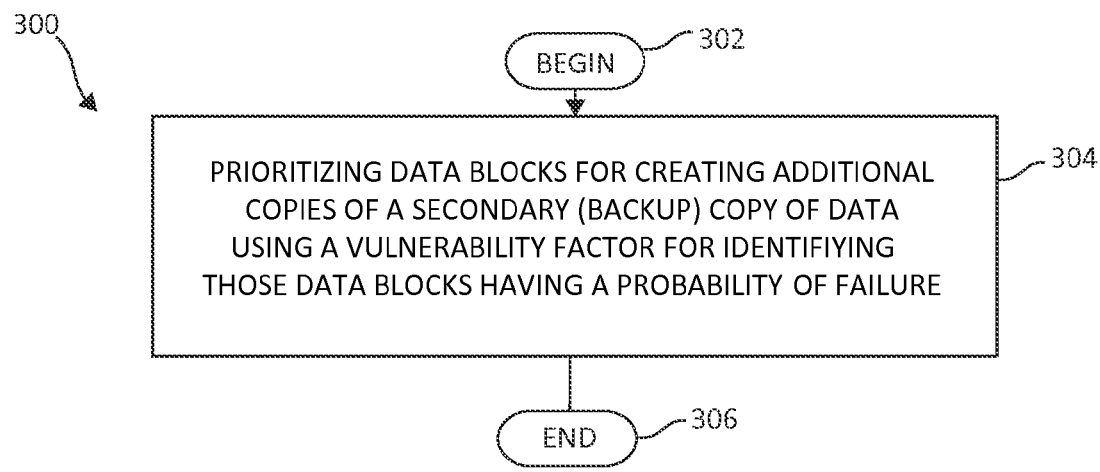
FIG. 3 is flow chart illustrating an exemplary method for prioritizing data blocks for creating additional secondary copies of data using a vulnerability factor for identifying data blocks having a probability of failure in which aspects of the present invention may be realized.

Turning now to FIG. 3, a flow chart illustrating an exemplary method 300 for prioritizing data blocks for creating additional secondary copies of data using a vulnerability factor for identifying data blocks having a probability of failure in which aspects of the present invention may be realized, is depicted. The method 300 begins (step 302) by prioritizing data blocks for creating additional secondary copies of data using a vulnerability factor for identifying those of the data blocks having a probability of failure (step 304). The method 300 ends (step 306).

Figure 4:
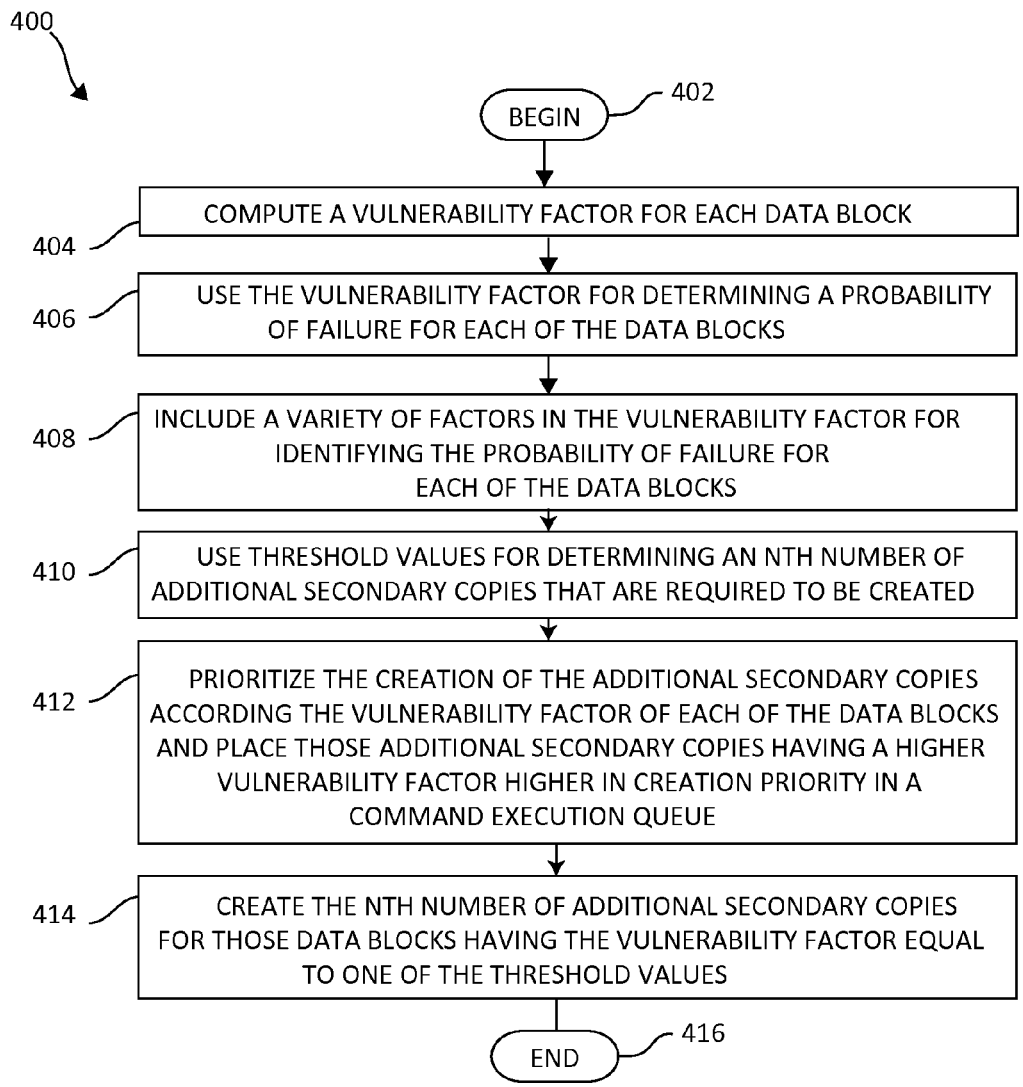
FIG. 4 is flow chart illustrating an additional exemplary method for prioritizing data blocks for creating additional secondary copies of data using a vulnerability factor for identifying data blocks having a probability of failure in which aspects of the present invention may be realized.

FIG. 4 is flow chart illustrating an additional exemplary method 400 for prioritizing data blocks for creating additional secondary copies of data using a vulnerability factor for identifying data blocks having a probability of failure in which aspects of the present invention may be realized. The method 400 begins (step 402) computes a vulnerability factor for each data block (step 404). The method 400 uses the vulnerability factor for determining a probability of failure for each of the data blocks (step 406). (This vulnerability factor is also used for determining whether an N number of the additional secondary copies are to be created.)

The method 400 includes a variety of factors in the vulnerability factor for identifying the probability of failure for each of the data blocks (step 408). These variety of factors (as mentioned above) include the overall system factor, the data category factor, the exact command that is being executed factor, the response from a command factor the time of failure factor, the success factor, the immediate vulnerability of each of the data blocks factor, and the backup copy factor to be included in the variety of factors that describe the overall risk associated with each of the data blocks that are included in the vulnerability factor.

Threshold values may be used for determining an nth number of additional secondary (backup) copies that are required to be created (step 410). The method 400 may prioritize the creation of the additional secondary copies that are required to be created according to the vulnerability factor of each of the data blocks and then place those additional secondary copies having a higher vulnerability factor higher in creation priority in a command execution queue (step 412). Those additional secondary copies having a higher value of the vulnerability factor are placed higher in priority in a command execution queue for creation. The method 400 creates the nth number of additional secondary copies for those data blocks having the vulnerability factor equal to one of the threshold values (step 414). The method 400 ends (step 416).

Thus, as described above, in one embodiment, by way of example only, data blocks are prioritized for creating an N number of additional secondary copies of data using a vulnerability factor for identifying those of the data blocks having a probability of failure. The data blocks include at least a primary copy and a secondary copy of the data, and in other embodiments, each of the data blocks may include at least a primary copy, a secondary copy, and the N number of additional secondary copies of the data. Also, in one embodiment, the data blocks are logical data blocks. The primary copy, the secondary copy, and the N number of the additional secondary copies of the data are active. The first one of the N number of the additional secondary copies is an active tertiary copy.

The vulnerability factor is calculated for each one of the data blocks. The vulnerability factor is used for determining whether the N number of the additional secondary copies are to be created. For computing the vulnerability factor, a variety of factors may be included and used for identifying a risk of failure for each of the data blocks. The variety of factors that may be included and may be used in the vulnerability factor may include all of the following factors: an overall system factor, a data category factor, an exact command that is being executed factor, a response from a command factor, a time of failure factor, a success factor, an immediate vulnerability of a specified storage device factor (e.g., a specified disc), and/or a backup copy factor to be included in the plurality of factors. The variety of factors may be computed for each executed command.

In one embodiment, the vulnerability factor may also include a vulnerability score. The vulnerability score may be used for determining the probability of failure, determining whether the N number of the additional secondary copies are to be created, and for determining a priority of creation for the N number of the additional secondary copies. The vulnerability factor is computed for each one of the data blocks by determining a multiplicative product of at least an immediate vulnerability of a specified storage device (e.g., a disc) factor and a backup copy factor. The vulnerability factor is used for comparing the vulnerability factor for one of the data blocks with the vulnerability factor of at least one alternative one of the data blocks and allocating scarce resources (e.g., free disk blocks to use in the backup copies) to either the data block or the alternative data block that has a greater vulnerability factor based on the comparison operation. In other words, if there are not enough resources for additional backup copies of both data blocks, the present invention may give and/or allocate the resources to the data block that most greatly needs the additional resources (e.g., the free disk blocks). The N number of the additional secondary copies are created for those of the data blocks having the probability of failure.

In one embodiment, a list of the data blocks is created, and an N number of additional data blocks having free space may be added to the list of data blocks for creating an N number of the additional secondary copies for those of the data blocks having the probability of failure. If one of the primary copies, the secondary copies, and the N number of the additional secondary copies from one of the data blocks in the list has a probability of failure and/or has actually failed, those of the primary copies, the secondary copies, and/or the N number of the additional secondary copies may be removed. The created N number of the additional secondary copies may replace those data blocks (e.g., one of the primary, secondary, and/or N number of the additional secondary copies) having the probability of failure and/or that have already failed.

A variety of thresholds (e.g., threshold values) may be used for determining the N number of the additional secondary copies may that are required to be created. In one embodiment, the N number of the additional secondary copies may be created for those of the data blocks having the vulnerability factor equal to one of the threshold values. The creation of the N number of the additional secondary copies are prioritized according to the vulnerability factor. Those of the N number of the additional secondary copies having a higher value of the vulnerability factor are placed higher in priority in a command execution queue for creating the N number of the additional secondary copies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for reducing data loss by a processor device in a computing storage environment, the method comprising:
   prioritizing a plurality of data blocks for creating an N number of additional secondary copies of data using a plurality of factors representing a vulnerability factor for each one of the plurality of data blocks for identifying those of the plurality of data blocks having a probability of failure, wherein the plurality of data blocks includes at least a primary copy and a secondary copy of the data;
   comparing the vulnerability factor for one of the plurality of data blocks with the vulnerability factor of at least one alternative one of the plurality of data blocks and allocating resources to either the one of the plurality of data blocks or the at least one alternative one of the plurality of data blocks that has a greater vulnerability factor based on the comparison;
   computing the vulnerability factor for each one of the plurality of data blocks;
   using the vulnerability factor for determining whether the N number of the additional secondary copies are to be created;
   creating a list of the plurality of data blocks;
   adding to the list of the plurality of data blocks an N number of additional data blocks having free space for creating the N number of the additional secondary copies for those of the plurality of data blocks having the probability of failure; and
   removing one of the primary copy, the secondary copy, and the N number of the additional secondary copies from one of the plurality of data blocks in the list if the one of the primary copy, the secondary copy, and the N number of the additional secondary copies has failed.

2. The method of claim 1, wherein the plurality of data blocks includes at least a primary copy, a secondary copy, and the N number of the additional secondary copies of the data, wherein the primary copy, the secondary copy, and the N number of the additional secondary copies of the data are active, and the first one of the N number of the additional secondary copies is an active tertiary copy, and further including using the vulnerability factor for determining whether an additional number of the N number of the additional secondary copies are to be created.

3. The method of claim 1, further including, for computing the vulnerability factor, including the plurality of factors in the vulnerability factor for identifying a risk of failure for the plurality of data blocks, wherein the vulnerability factor includes a vulnerability score.

4. The method of claim 3, further including computing one of an overall system factor, a data category factor, an exact command that is being executed factor, a response from a command factor, a time of failure factor, a success factor, an immediate vulnerability of a specified storage device factor, and a backup copy factor to be included in the plurality of factors.

5. The method of claim 3, further including computing the plurality of factors for each executed command.

6. The method of claim 3, further including:
   using the vulnerability score for the determining the probability of failure, and
   using a final vulnerability score for determining whether the N number of the additional secondary copies are to be created and for determining a priority of creation for the N number of the additional secondary copies.

7. The method of claim 3, further including computing the vulnerability factor for each one of the plurality of data blocks by determining a multiplicative product of at least an immediate vulnerability of a specified storage device factor and a backup copy factor.

8. The method of claim 6, further including creating the N number of the additional secondary copies for those of the plurality of data blocks having the probability of failure.

9. The method of claim 1, further including using a plurality of thresholds values for determining the N number of the additional secondary copies that are required to be created.

10. The method of claim 9, further including creating the N number of the additional secondary copies for those of the plurality of data blocks having the vulnerability factor equal to one of the plurality of threshold values.

11. The method of claim 9, further including prioritizing the creation of the N number of the additional secondary copies according to the vulnerability factor, wherein those of the N number of the additional secondary copies having a higher value of the vulnerability factor are placed higher in priority in a command execution queue for creation.

12. A system for reducing data loss in a computing storage environment, the system comprising:
   at least one processor device operable in the computing storage environment, wherein the at least one processor device:
      prioritizes a plurality of data blocks for creating an N number of additional secondary copies of data using a plurality of factors representing a vulnerability factor for each one of the plurality of data blocks for identifying those of the plurality of data blocks having a probability of failure, wherein the plurality of data blocks includes at least a primary copy and a secondary copy of the data,
      compares the vulnerability factor for one of the plurality of data blocks with the vulnerability factor of at least one alternative one of the plurality of data blocks and allocating resources to either the one of the plurality of data blocks or the at least one alternative one of the plurality of data blocks that has a greater vulnerability factor based on the comparison, computes the vulnerability factor for each one of the plurality of data blocks;

uses the vulnerability factor for determining whether the N number of the additional secondary copies are to be created, creates a list of the plurality of data blocks, adds to the list of the plurality of data blocks an N number of additional data blocks having free space for creating the N number of the additional secondary copies for those of the plurality of data blocks having the probability of failure, and removes one of the primary copy, the secondary copy, and the N number of the additional secondary copies from one of the plurality of data blocks in the list if the one of the primary copy, the secondary copy, and the N number of the additional secondary copies has failed.

13. The system of claim 12, wherein the plurality of data blocks further includes at least a primary copy, a secondary copy, and the N number of the additional secondary copies of the data, wherein the primary copy, the secondary copy, and the N number of the additional secondary copies of the data are active, and the first one of the N number of the additional secondary copies is an active tertiary copy, wherein the at least one processor device uses the vulnerability factor for determining whether an additional number of the N number of the additional secondary copies are to be created.

14. The system of claim 12, wherein the at least one processor device, for computing the vulnerability factor, includes the plurality of factors in the vulnerability factor for identifying a risk of failure for the plurality of data blocks, wherein the vulnerability factor includes a vulnerability score.

15. The system of claim 14, wherein the at least one processor device computes one of an overall system factor, a data category factor, an exact command that is being executed factor, a response from a command factor, a time of failure factor, a success factor, an immediate vulnerability of a specified storage device factor, and a backup copy factor to be included in the plurality of factors.

16. The system of claim 14, wherein the at least one processor device computes the plurality of factors for each executed command.

17. The system of claim 14, wherein the at least one processor device performs one of:

using the vulnerability score for the determining the probability of failure, and using a final vulnerability score for determining whether the N number of the additional secondary copies are to be created and for determining a priority of creation for the N number of the additional secondary copies.

18. The system of claim 14, wherein the at least one processor device computes the vulnerability factor for each one of the plurality of data blocks by determining a multiplicative product of at least an immediate vulnerability of a specified storage device factor and a backup copy factor.

19. The system of claim 17, wherein the at least one processor device creates the N number of the additional secondary copies for those of the plurality of data blocks having the probability of failure.

20. The system of claim 12, wherein the at least one processor device uses a plurality of thresholds values for determining the N number of the additional secondary copies that are required to be created.

21. The system of claim 20, wherein the at least one processor device creates the N number of the additional secondary copies for those of the plurality of data blocks having the vulnerability factor equal to one of the plurality of threshold values.

22. The system of claim 20, wherein the at least one processor device prioritizes the creation of the N number of the additional secondary copies according to the vulnerability factor, wherein those of the N number of the additional secondary copies having a higher value of the vulnerability factor are placed higher in priority in a command execution queue for creation.

23. A computer program product for reducing data loss in a computing storage environment by a processor device, the computer program product comprising a non-transitory computer-readable storage medium having computer-readable program code portions stored therein, the computer-readable program code portions comprising:

a first executable portion prioritizes a plurality of data blocks for creating an N number of additional secondary copies of data using a plurality of factors representing a vulnerability factor for each one of the plurality of data blocks for identifying those of the plurality of data blocks having a probability of failure, wherein the plurality of data blocks includes at least a primary copy and a secondary copy of the data;

compares the vulnerability factor for one of the plurality of data blocks with the vulnerability factor of at least one alternative one of the plurality of data blocks and allocating resources to either the one of the plurality of data blocks or the at least one alternative one of the plurality of data blocks that has a greater vulnerability factor based on the comparison;

computes the vulnerability factor for each one of the plurality of data blocks;

uses the vulnerability factor for determining whether the N number of the additional secondary copies are to be created;

creates a list of the plurality of data blocks;

adds to the list of the plurality of data blocks an N number of additional data blocks having free space for creating the N number of the additional secondary copies for those of the plurality of data blocks having the probability of failure; and removes one of the primary copy, the secondary copy, and the N number of the additional secondary copies from one of the plurality of data blocks in the list if the one of the primary copy, the secondary copy, and the N number of the additional secondary copies has failed.

24. The computer program product of claim 23, wherein the plurality of data blocks includes at least a primary copy, a secondary copy, and the N number of the additional secondary copies of the data, wherein the primary copy, the secondary copy, and the N number of the additional secondary copies of the data are active, and the first one of the N number of the additional secondary copies is an active tertiary copy, and further includes a second executable portion that uses the vulnerability factor for determining whether an additional number of the N number of the additional secondary copies are to be created.

25. The computer program product of claim 23, further including a second executable portion that, for computing the vulnerability factor, includes the plurality of factors in the vulnerability factor for identifying a risk of failure for the plurality of data blocks, wherein the vulnerability factor includes a vulnerability score.

26. The computer program product of claim 25, further including a third executable portion that computes one of an overall system factor, a data category factor, an exact command that is being executed factor, a response from a command factor, a time of failure factor, a success factor, an immediate vulnerability of a specified storage device factor, and a backup copy factor to be included in the plurality of factors.

27. The computer program product of claim 25, further including a third executable portion that computes the plurality of factors for each executed command.

28. The computer program product of claim 25, further including a third executable portion that performs one of:
  using the vulnerability score for the determining the probability of failure, and
  using a final vulnerability score for determining whether the N number of the additional secondary copies are to be created and for determining a priority of creation for the N number of the additional secondary copies.

29. The computer program product of claim 25, further including a third executable portion that computes the vulnerability factor for each one of the plurality of data blocks by determining a multiplicative product of at least an immediate vulnerability of a specified storage device factor and a backup copy factor.

30. The computer program product of claim 28, further including a fourth executable portion that creates the N number of the additional secondary copies for those of the plurality of data blocks having the probability of failure.

31. The computer program product of claim 23, further including a second executable portion that using a plurality of thresholds values for determining the N number of the additional secondary copies that are required to be created.

32. The computer program product of claim 31, further including a third executable portion that creates the N number of the additional secondary copies for those of the plurality of data blocks having the vulnerability factor equal to one of the plurality of threshold values.

33. The computer program product of claim 31, further including a third executable portion that prioritizes the creation of the N number of the additional secondary copies according to the vulnerability factor, wherein those of the N number of the additional secondary copies having a higher value of the vulnerability factor are placed higher in priority in a command execution queue for creation.

* * * * *